United States Patent
Mead et al.

[11] Patent Number: 6,061,728
[45] Date of Patent: May 9, 2000

[54] ARRANGEMENT FOR CONTROLLING NETWORK PROXY DEVICE TRAFFIC ON A TRANSPARENTLY-BRIDGED LOCAL AREA NETWORK USING A MASTER PROXY DEVICE

[75] Inventors: Andrew Joseph Mead, Durham, N.C.; Frank Gerard Bordonaro, Los Gatos; John Lautmann, Fremont, both of Calif.; Scott Allen Bales, Durham, N.C.; Uwe Sellentin, San Jose, Calif.

[73] Assignee: Cisco Technology, Inc., San Jose, Calif.

[21] Appl. No.: 09/318,431

[22] Filed: May 25, 1999

[51] Int. Cl.[7] .................................................. G06F 13/00
[52] U.S. Cl. .................................................. 709/227
[58] Field of Search .................................. 709/200, 201, 709/217, 218, 220, 223, 224, 225, 227, 228, 229, 249; 370/395, 401, 465, 466

[56] References Cited

U.S. PATENT DOCUMENTS

| | | | |
|---|---|---|---|
| 5,461,611 | 10/1995 | Drake, Jr. et al. | 370/401 |
| 5,561,669 | 10/1996 | Lenney et al. | 370/404 |
| 5,600,644 | 2/1997 | Chang et al. | 370/404 |
| 5,805,805 | 9/1998 | Civanlar et al. | 370/409 |
| 5,946,311 | 8/1999 | Alexander, Jr. et al. | 370/395 |
| 5,949,779 | 9/1999 | Mostafa et al. | 370/389 |

Primary Examiner—Moustafa M. Meky
Attorney, Agent, or Firm—Leon R. Turkevich

[57] ABSTRACT

A transparently-bridged wide area network connecting Ethernet/IEEE 802.3-based local area networks uses redundant proxy devices on each LAN for internetwork communications. The proxy devices on a given LAN, implemented as data link switching (DLSw) devices, identify amongst each other a master proxy device for mediating services to be provided to an end station on the local area network. Each proxy device connected to the local area network sends a request to the identified master proxy device in response to detecting a frame transmitted by an end station on the local area network, for permission to establish a circuit connection for transfer of the frame via a wide area network. The master proxy device, based on prescribed criteria, selects one of the proxy devices for transferring the frame, and sends a grant response to the selected proxy device. The master proxy device sends an "inuse" response as a denial response to the other proxy devices indicating the corresponding request has been denied, thereby avoiding contention for proxy services. Databases within the proxy devices track the request, grants, and denials to minimize generation of repeated requests. The inventory of granted requests may also be modified based on failures detected within the master proxy device, or any proxy device having received grants. Hence, redundant DLSw-type proxy devices may be implemented on a local area network while maintaining a stable and a robust communications system.

44 Claims, 4 Drawing Sheets

ARRANGEMENT FOR CONTROLLING
NETWORK PROXY DEVICE TRAFFIC ON A
TRANSPARENTLY-BRIDGED LOCAL AREA
NETWORK USING A MASTER PROXY
DEVICE

BACKGROUND OF THE INVENTION

1. Field of the Invention

The present invention relates to transparent bridging technology, more particularly to arrangements for providing transparent bridging between local area networks having multiple proxy devices serving as entry points for communication across a wide area network.

2. Description of the Related Art

Transparent bridging technology is a popular mechanism for interconnecting local area networks. Transparent bridges, popular in Ethernet/IEEE 802.3 Networks, are so named because their presence and operation are transparent to network hosts. When transparent bridges are powered on, they learn the network topology by analyzing the source address of incoming frames from all attached networks. If, for example, a bridge sees a frame arrive on line 1 from host A, the bridge concludes that host A can be reached through the network connected to line 1. Through this process, transparent bridges build a table that can be used for traffic forwarding.

Once the bridge has built a forwarding table, the bridge can forward a frame, received on one of the bridge ports, by looking up the frame's destination address in the forwarding table. If the forwarding table contains an association between the destination address and any bridge port other than the inbound port having received the frame, the bridge outputs the frame on the indicated port. If no association is found, the frame is flooded to all ports except the inbound port.

A design assumption with transparent bridging is for any particular media access control (MAC) address at any particular time, there will be at most one path through the transparent bridged network by which that MAC address can be reached. This design assumption is typically implemented through the use of the spanning-tree algorithm, which detects and eliminates any loops created by two or more transparent bridges by causing a sufficient number of bridge ports to enter a "blocking" mode. By eliminating all loops in the network, the only way a MAC address could be reachable through the multiple paths would be if more than one device advertised the same MAC address; since it is a violation of the IEEE 802.3 specification for an individual MAC address to be used by more than one device within a bridged network, the reachability of a MAC address by multiple paths is normally not an issue.

A limitation of transparent bridging technology is that there is no information contained within a packet to inform the bridge device the path from where the packet came, or the path to where the packet is destined. For example, the IEEE 802.5 token ring LAN specification describes source-route bridging (SRB) as a technique for bridging local area networks. Source-route bridging algorithms add the complete source-to-destination route in all inter-LAN frames sent by the source, such that all source route bridges store and forward the frames as indicated by the route appearing in the appropriate frame field.

Figure 1:
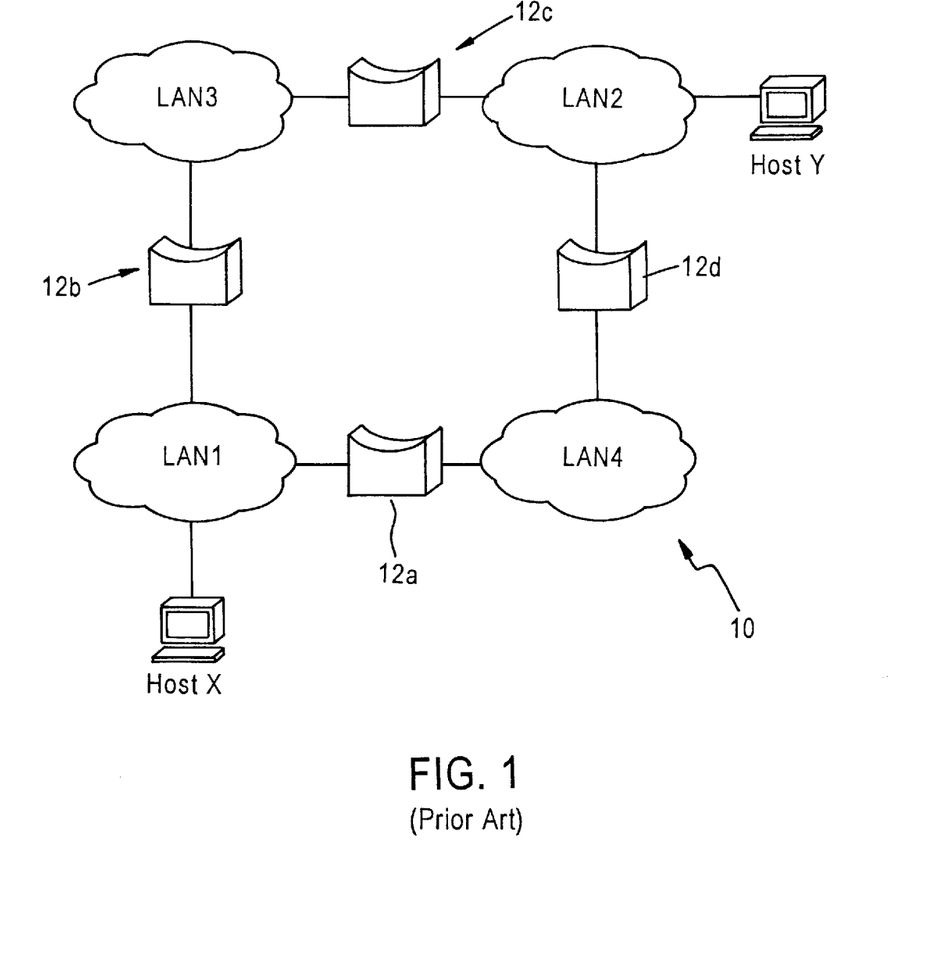
FIG. 1 is a block diagram of a conventional internetwork using source route bridging for interconnection of token ring-based local area networks.

FIG. 1 is a diagram illustrating an exemplary source-route bridged network 10. Assume that host X in FIG. 1 wishes to send a frame to host Y, and that initially host X does not know whether host Y resides on the s am e token ring (IEEE 802.5) local area network (LAN 1) or a different LAN segment. Hence, host X sends out a test frame onto LAN 1. If the test frame traverses around the token ring of LAN1 and returns to host X without a positive indication that host Y has seen the test frame, host X assumes that host Y is on a remote LAN segment. Different techniques may be used to learn a route through a source-route bridge, for example all-route explorers or single-route explorers. In the case of all-route explorers, host X sends an explorer frame to determine the remote location of host Y. Each bridge 12a, 12b receiving the explorer frame copies the frame onto all outbound ports. Route information is added to the explorer frames as they travel through the internetwork 10 via bridges 12c and 12d. When the explorer frames initially generated by host X reach host Y on LAN2, host Y replies to each received explorer frame using the accumulated route information. Upon receipt of all response frames that specify their respective paths, host X chooses a path based on predetermined criteria.

The route information is accumulated in a routing information field (RIF), specified under IEEE 802.5. A RIF is included only in those frames destined for other LANs, and the presence of routing information within the frame is indicated by the setting of the most significant bit within the source address field, called the routing information indicator (RII) bit.

As readily apparent from the foregoing, a limitation of transparent bridging technology is that there is no RIF functionality in IEEE 802.3 based networks, hence there is no information contained within a packet to inform the bridge device from where the packet came, or to where the packet is destined. This limitation is readily apparent from conventional Ethernet IEEE 802.3 networks as a packet will only have one path through a network.

New mechanisms have been developed for reliable transfer of traffic from an Ethernet IEEE 802.3 local area network across a wide area network. The consequences of these advances is that limitations which were not crucial for local operation of the Ethernet/802.3 local area network have become more cumbersome. For example, there are certain devices (e.g., and stations) in the network, referred to as "proxies", which represent a large number of other devices (e.g., end stations) elsewhere in the network; traffic destined for these end stations are accepted by the proxies, and traffic from these end stations enter the transparently bridged LAN through these proxies. One common example of this type of proxy device is a data link switching (DLSw) peer device, as described in RFC 1795.

Data link switching (DLSw) was developed as a means of transporting IBM Systems Network Architecture (SNA) and Network Basic Input/Output System (NetBIOS) traffic over a IP Network. The DLSw serves as an alternative to source route bridging protocols that were used for transporting SNA and NetBIOS traffic in token ring environments. The principal difference between source route bridging and DLSw revolves around support of local termination. SNA and NetBIOS traffic rely on link-layer acknowledgements and keep-alive messages to ensure the integrity of connections and the delivery of data. For connection-oriented data, the local DLSw node or router terminates data-link control. Therefore, link-layer acknowledgments and keep-alive messages do not need to traverse a wide area network. DLSw nodes or routers use a switch-to-switch protocol (SSP) for establishment and maintenance of DLSw circuits across a wide area network. The DLSw nodes encapsulate packets in TCP/IP for transport on IP based networks, using TCP as a means of reliable transport between DLSw nodes.

The use of DLSw type proxy devices does not create a problem in conjunction with transparent bridging, so long as there is only one such proxy device connected to the transparently-bridged LAN, or so long as no set of two or more of these devices can provide proxy services for a particular MAC address. Hence, only a single proxy device may provide proxy services for a transparently-bridged local area network segment, resulting in reliability concerns if the proxy device fails. As such, failure of a single network device such as the proxy could result in a loss of connectivity from a large number of end stations. However, efforts at improving network reliability by adding a redundant proxy seem unattainable as it violates the basic design assumption of transparent bridging, since the added proxy would give the appearance of providing two separate paths to a single resource in a transparent bridged network.

This problem is readily apparent from the example of a proxy device attempting to establish a circuit connection across the wide area network at the same time that another proxy device on the same local area network also attempts to establish a circuit connection via the wide area network. This contention for circuit establishment may arise, for example, in response to reception of a frame transmitted by an end station on the local area network. Since proxy devices on the same local area network may attempt to provide proxy service for the same remote device, both proxy devices in this case may attempt to establish a circuit connection for the same transmitted packet. The contending proxy devices will thus establish duplicate circuits, resulting in a destructive operation within the network. Hence, the attempt to add multiple proxy devices for redundancy may result in the more adverse impact of interfering with the attempted establishment of circuit connections across the wide area network.

SUMMARY OF THE INVENTION

There is a need for an arrangement in a transparently-bridged wide area network, where proxy devices attached to the same LAN can share in proxy services for end stations on a local area network, without interfering with each other.

There is also a need for an arrangement that eliminates contention between multiple proxy devices coupled to a local area network for providing proxy services to an end station on the local area network.

There is also a need for an arrangement in a transparently-bridged wide area network, where multiple proxy devices connected to the same local area network are able to mediate for services to be provided to an end station on the local area network, thereby avoiding contention for proxy services.

These and other needs are attained by the present invention, where a master proxy device is identified from a plurality of proxy devices coupled to a local area network. In response to detecting a frame transmitted by a first station on the local area network, each proxy device sends a request to the master proxy device for permission to establish a circuit connection for transfer of the frame via the wide area network. The master proxy device, based on prescribed criteria, selects one of the proxy devices for transferring the frame. The master proxy device sends a grant response to the selected proxy device and an "in use" response to the other proxy devices indicating the request has been denied. Hence, the master proxy device manages the traffic flow by the proxy devices, enabling multiple proxy devices to be used on the same local area network without contention for the same proxy services.

According to one aspect of the present invention, a method of intercommunication is provided between first and second local area networks via a wide area network. The method includes identifying a master proxy device from among at least two proxy devices coupled to the first local area network, receiving by the proxy devices a frame transmitted by a first end station onto the first local area network for transfer to the second local area network via the wide area network, sending a request to the master proxy device, by at least one of the other proxy devices on the first local area network, to transfer the frame to the second local area network, outputting a response by the master proxy device onto the first local area network to the at least one other proxy device indicating whether the corresponding request is granted, and determining whether a circuit may be initiated via the wide area network for transfer of the frame, by the at least one other proxy device, based on the corresponding response received from the master proxy device.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numerals represent like elements throughout and wherein.

BEST MODE FOR CARRYING OUT THE INVENTION

Figure 2:
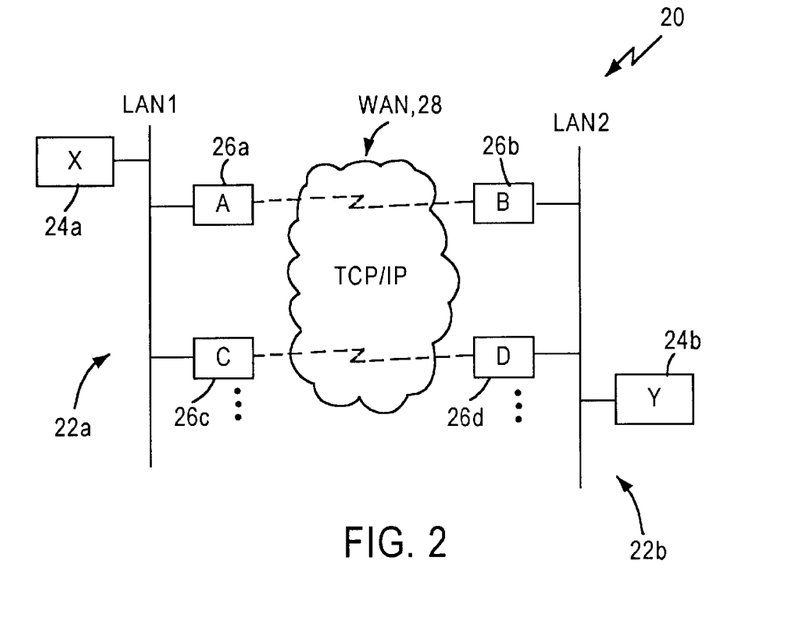
FIG. 2 is a block diagram of an arrangement for interconnecting local area networks across a wide area network using multiple proxy devices according to an embodiment of the present invention.

FIG. 2 is a block diagram illustrating an internetworking system 20 for communication of end stations across a wide area network according to an embodiment of the present invention. As shown in FIG. 2, the internetworking system 20 includes a first local area network 22a and a second local area network 22b. Each local area network 22 typically includes end stations 24, and at least two proxy devices 26 coupled to the corresponding local area network 22 for communication across the wide area network (WAN) 28. For example, proxy devices 26a and 26c are coupled to LAN 22a, whereas proxy devices 26b and 26d are coupled to LAN 22b. According to the disclosed embodiment, the LANs 22a and 22b are Ethernet IEEE 802.3-based local area networks. Hence, data packets transmitted on the LANs 22 have a source address and destination address, but no RIF field as found in token ring IEEE 802.5 networks.

As shown in FIG. 2, each proxy device 26 is configured for communication with another proxy device 26 in another network 22. For example, proxy device 26a is configured for communication via WAN 28 with proxy device 26b, and proxy device 26c is configured for communication with proxy device 26d via the WAN 28. As such, proxy devices 26a and 26b are configured as peers across WAN 28, and proxy devices 26c and 26d are configured as peers across WAN 28. Each proxy device 26 may have multiple peers for communication with respective LANs.

According to the disclosed embodiment, each proxy device 26 is configured as a data link switching (DLSw) device, also referred to as a DLSw router, for transporting information between local area networks 22a and 22b according to the Internet Engineering Task Force (IETF) Request For Comments (RFC 1795).

The DLSw operational process involves three basic components, namely capabilities exchange, circuit establishment, and flow control. Capabilities exchange involves the trading of information about capabilities associated with a proxy device session. The exchange of information is negotiated when the session is initiated and during the course of session operations. Circuit establishment occurs between end systems, for example between nodes 24a and 24b, and includes locating the target end system and setting up data-link control connections, also referred to as circuit connections, between each end system (e.g., end station 24a) and its local router (e.g., proxy device 26a). DLSw flow control enables the establishment of independent, unidirectional flow control between DLSw partners 26a and 26b, or partners 26c and 26d.

As described above, the disclosed embodiment is directed to DLSw circuit establishment between a pair of end systems 24a and 24b. Conventional systems assume that one and only one router 26 is connected to any transparently-bridged local area network 22. For example, assume proxy devices 26a and 26c receive a SABME or XID message from the end station 24a via the local area network 22a that specifies "X" as a source address and "Y" as a destination MAC address for end station 24b. The SABME (Set Asynchronous Balanced Mode Extended) or XID messages are logical link control (LLC) level type-2 (LLC2) messages used to establish connections for transmission of data between end stations 24. Each LLC2 connection uses a single DLSw circuit across the WAN 28.

According to RFC 1795, the reception by a proxy device (e.g., 26a) of a SABME frame, or an exchange identifier (XID) frame in SNA architectures by IBM, would start a DLSw circuit. Normally a proxy device 26a would respond to a SABME frame or XID frame by sending a "canureach-circuit start" frame (CUR-cs) to a corresponding peer device (e.g., 26b) based on the destination MAC address in the detected frame. For example, in response to receiving the message on LAN 22a that specifies "X" as a source MAC address and "Y" as a destination MAC address, each proxy device 26a and 26c would send a CUR-cs message to the corresponding peer device 26b and 26d, respectively. Normally the peer 26b would send the SABME or XID message to the end station 24b, and which point the end station 24b would respond with a UA frame for a SABME request or an XID response for an XID request. If each LAN 22a had only one proxy 26 (e.g., 26a), the corresponding peer (e.g., 26b) would respond to the CUR-cs with an "icanreach-circuit start" (ICR-cs) message, enabling a circuit connection to be established between peers 26a and 26b. In the case of XID request/XID response causing the DLSw circuit to be established, the XID's (there may be several more exchanged between the 2 stations) will be followed by one of the stations sending a SABME and the other responding with a UA. Hence, whether the frame that triggered the establishment of the circuit was a SABME or an XID, the circuit would not actually reach a connected state until the UA following the SABME was sent to the appropriate end station 24a. Hence, the circuit between peers 26a and 26b would not reach a connected state until the end station 24a received the UA or XID response from the local proxy device 26a.

As readily apparent from the foregoing, an LLC2 connection normally cannot be established if there are two proxy devices 26a and 26c on the same LAN 22a contending for proxy services for the end station 24a. Using the above example, if proxy devices 26a and 26c were both to forward CUR-cs frames in response to detecting the SABME or XID frames from end station 24a, the end station 24b would receive two requests, and either respond to both requests or reject both requests. Even if both responses (ICR-cs) were transmitted back across the WAN 28, the detection of two responses (e.g., UA or XID) transmitted by the proxy devices 26a or 26c would cause the end station 24a to break down the connection.

According to the disclosed embodiment, a master proxy device is identified from among the proxy devices 26a and 26c coupled to the local area network 22a to enable resolution of contention for proxy services. As described below, the master proxy devices mediates between requests by other proxy devices as well as the master proxy device itself, for circuit establishment across the wide area network 28 for intercommunication between end stations 24a and 24b.

Figure 3:
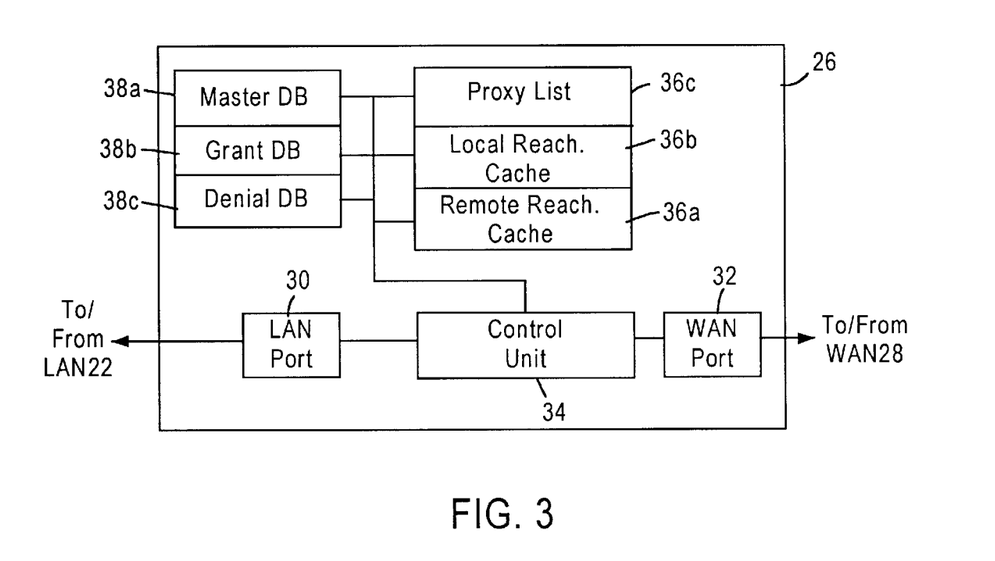
FIG. 3 is a block diagram illustrating in detail the proxy device of FIG. 2.

FIG. 3 is a block diagram illustrating a proxy device 26 according to an embodiment of the present invention. The proxy device 26 is preferably implemented as a DLSw router configured in accordance with RFC 1795. The proxy device includes a LAN port 30 for sending and receiving data from network nodes for an associated LAN 22 according to the local area network protocol, for example Ethernet/IEEE 802.3 protocol.

The proxy device 26 also includes a wide area network port 32 for sending and receiving messages onto the wide area network 28 using TCP/IP protocol. The proxy device 26 also includes a controller 34, and caches 36 that store addressing information for different network nodes that are reachable by the proxy device 26. The proxy device 26 also includes circuit control databases 38, described below. The remote reachability cache 36a stores MAC addresses corresponding to end stations 24 that are reachable only via the WAN 28. The local reachability cache 36b stores MAC addresses corresponding to end stations 24 the are reachable via the associated local area network 22. Hence, proxy devices 26a and 26c would store the MAC address ("X") for end device 24a in their respective local reachability caches 36b. The proxy list 36c stores the addresses of all reachable proxy devices 26, including actual connection peers as well as other proxy devices connected to the same local area network 22. For example, the proxy device 26a will store in its proxy list 36c the MAC address for proxy device 26c, and well as the network address for its corresponding peer 26b. Hence, the controller 34 can effectively identify network nodes that are reachable via the local area network 22, the wide area network 28, and whether any of those network nodes are end stations 24 or other proxy devices 26.

The circuit control databases 38 include up to three databases that are built up during mediation of requests by the master device in responding to requests from other proxy devices. For example, the master proxy device includes a master database 38a for storing grant entries for identified proxy devices 26 that have been granted permission to build a specified circuit across the WAN 28 for a particular pair of end stations on respective networks 22a and 22b. Grant entries are maintained in the master database 38a until the circuit connecting the end stations is disconnected, at which point the proxy device 26 having the circuit connection sends a circuit release message to the master proxy device. The grant entries stored in the master database 38a insure that no subsequent requests are granted for communication between two specified end stations once the proxy granted permission has built the circuit across the WAN 28.

The grant database 38b and the denial database 38c are used by the proxy devices to identify whether any generated requests have been granted or denied. An entry in the grant database 38b enables the corresponding proxy device 26 to automatically send a received frame on an established link, without the necessity of generating another request to the master proxy device. The denial database 38c enables a proxy device, having been denied a request, to minimize the number of subsequent requests in response to detecting additional frames having the same source/destination addresses as the denied request. Hence, the databases 38b and 38c minimize the number of requests that are sent to the master proxy device. The entries in the denial database 38c may be removed, for example upon detecting a circuit release message from another proxy device that identifies the corresponding source/destination pair, or by deletion after a prescribed time interval.

Figure 4A:
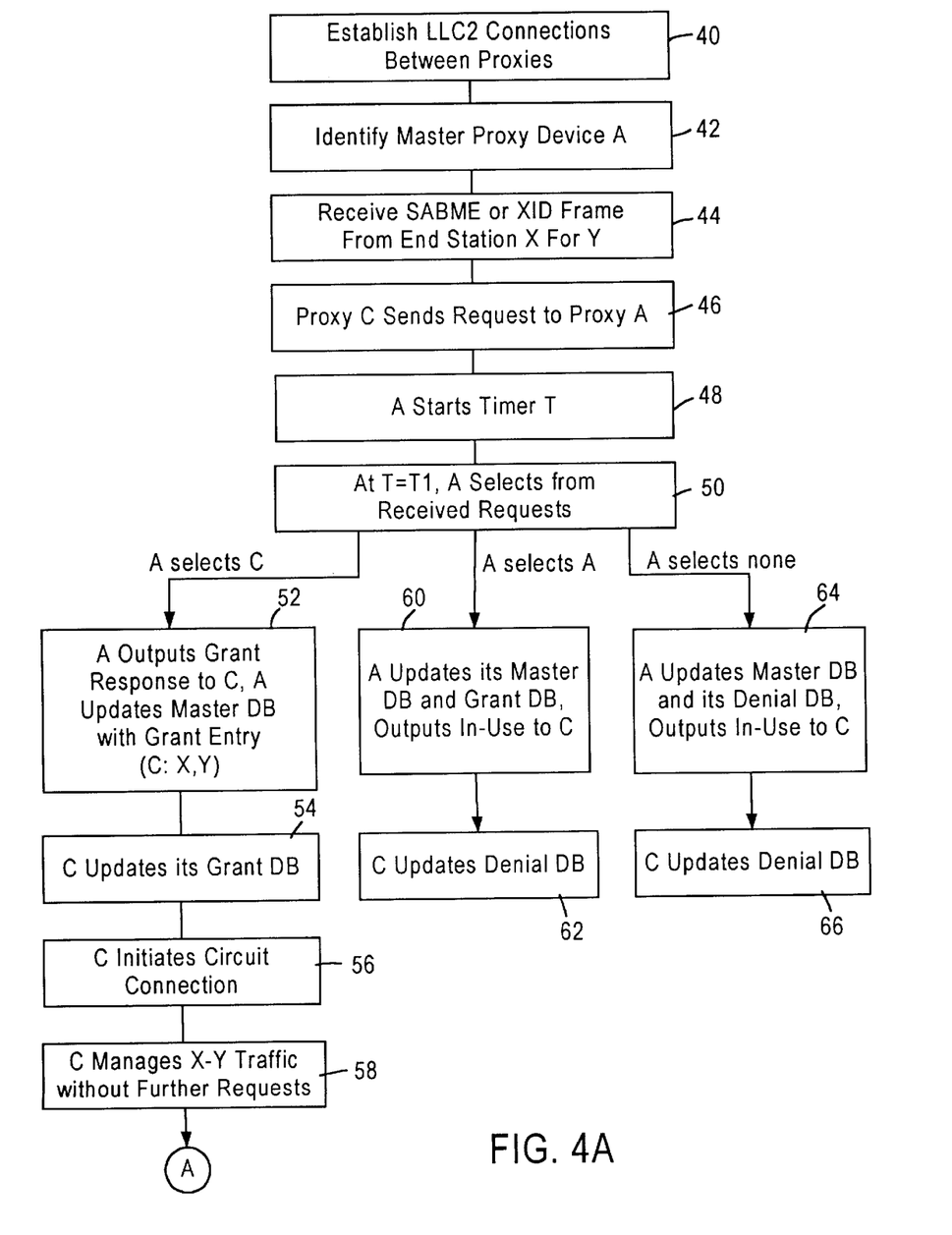
FIGS. 4A, 4B, and 4C are flow diagrams summarizing the method for intercommunication between local area networks having multiple proxy devices according to an embodiment of the present invention.
Figure 4B:
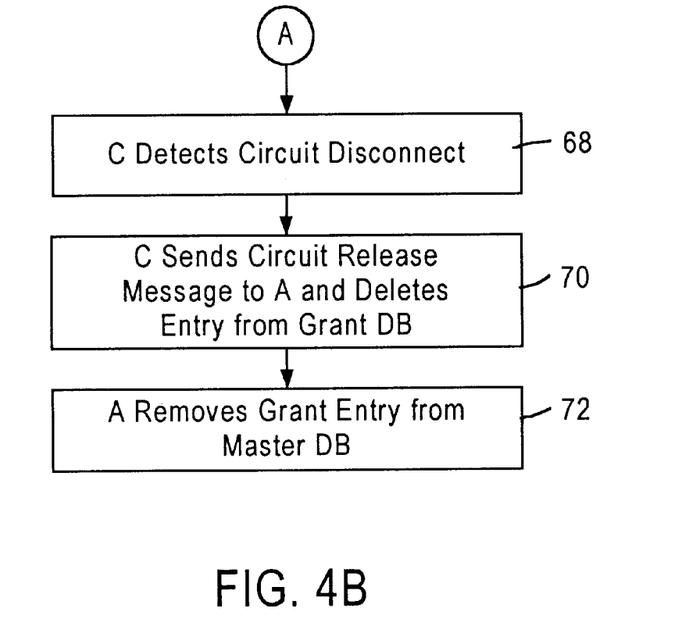
Figure 4C:
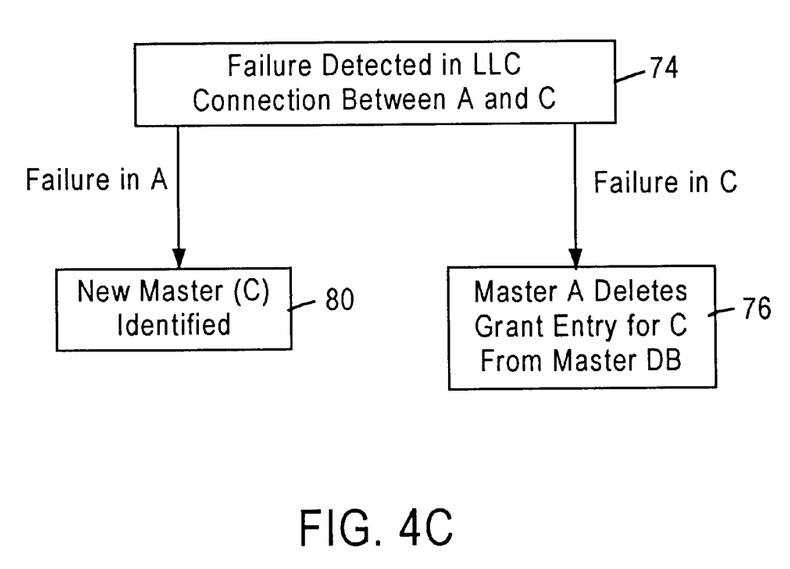

FIGS. 4A, 4B and 4C are diagrams summarizing the method for intercommunication between the first and second local area network 22a and 22b via the WAN 28 according to an embodiment of the present invention. The method of FIGS. 4A, 4B and 4C is implemented for example, by storing sequences of instructions on a computer readable medium in the control unit 34 and executing those stored instructions.

As shown in FIG. 4A, each of the proxies 26a and 26c on LAN 22a establish LLC2 connections between each other in step 40, enabling the proxies 26a and 26c to advertise their respective addresses and capabilities. The LLC2 connections may also be used by the proxy devices 26a and 26c to determine the presence of a failure in any one of the proxy devices, described below.

The proxy devices 26a and 26c then mediate amongst each other to identify a master proxy device (e.g., device A) in step 42. Different arrangements for identifying a master proxy device may be used, for example random selection, alternative assignments between proxies, or a hierarchical-based assignment process. Although only two proxy devices 26a and 26c are shown in FIG. 2, it should be appreciated that a greater plurality of proxy devices 26 may be coupled to the local area network 22a and/or 22b, where each of the proxy devices connected to the associated local area network 22 participate in the methodology of FIGS. 4A–4C.

The method then continues in step 44 by the transmission of a frame by the end station 24a having a source address "X" and a destination address "Y", for example a SABME frame or an XID frame, and reception by the proxy devices 26a and 26c. In response to detecting the frame from end station 24a, each proxy device (e.g., 26c) sends a request in step 46 to the master proxy device 26a for permission to establish a circuit connection to transfer the frame to the second local area network 22b via WAN 28. In response to receiving the request from proxy device 26c, the master proxy device 26a starts a timer T in step 48 to enable a request window for any other proxy devices coupled to the local area network 22a. Once the timer T reaches a prescribed time interval (T=T1), the master proxy device 26a selects a proxy device from one of the received requests in step 50. Note that the master proxy device 26a may submit its own request. The master proxy device 26a may therefore choose one of three options in step 50, namely selecting another proxy device, selecting the master proxy device itself, or selecting no proxy device, for example to insure that transfer of the frame is blocked.

Assuming the master proxy device 26a grants the request from proxy device 26c, the master proxy device 26a outputs a grant response to proxy device 26c in step 52. The master proxy device 26a also updates its master database 38a in step 52 with a grant entry identifying proxy device 26c, source address X, and destination address Y.

In response to reception of the grant response, the proxy device 26c updates its grant database 38b in step 54, and initiates the circuit connection in step 56 with its corresponding peer proxy device 26d. Since the proxy device 26c has stored the grant in its associated grant database 38b, the proxy device 26c is able to manage traffic between addresses X and Y without the necessity of generating any further request to the master proxy device 26a (step 58).

Returning to step 50, assume that the master proxy device 26a selects itself for establishment of the circuit between end stations 24a and 24b. In this case, the master proxy device 26a updates its master database 38a and its grant database 38b in step 60, and outputs an "in-use" response to proxy device 26c. The proxy device 26c, in response to reception of the in-use response from the master proxy device 26a, updates its corresponding denial database 38c in step 62 indicating denial of the corresponding request. Hence, if the proxy device 26c detects any further frames having an address pair of "X" and "Y", the proxy device 26c, upon accessing its denial database 38c, will recognize that it need not send a request for circuit connection to the master proxy device 26a, since the request would be denied.

Assuming in step 50 that master proxy device 26a determines according to some predetermined conditions that no proxy device should be granted permission to establish a circuit connection across the WAN 28, and that the frame transmitted from the end station 24a should be blocked. In this case, the master proxy device 26a updates its master database 38a and its denial data 38c in step 64, and outputs an in-use response to the proxy device 26c. The proxy device 26c, in response to reception of the in-use message, updates its corresponding denial database 38c in step 66, such that the frame transmitted by the end station 24a is blocked from transmission across the WAN 28.

Referring to FIG. 4B, once the proxy device 26c has established a circuit connection with the corresponding peer 26d across the WAN 28, the proxy device 26c continues to maintain the circuit connection until the proxy 26c detects a circuit disconnect in step 68. In response to detecting the disconnect condition, the proxy device 26c sends a circuit release message to the master proxy device 26a, and deletes the grant entry from the corresponding grant database 38b in step 70. The master proxy device 26a, in response to detecting the release message, removes the grant entry from the master database 38a in step 72, and forwards the message to all other proxy devices on the LAN to purge the appropriate entry from their respective denial databases 38c.

According to the disclosed embodiment, the master proxy device mediates requests for circuit connections and selectively grants permissions and denials to different proxy devices, for example based on load conditions and the like. The disclosed embodiment is also able to modify the status of granted requests and if necessary assign a new proxy device in the event of detected failures.

Referring to FIG. 4C, assume that a failure is detected in step 74 in the LLC2 connections between the proxy devices 26a and 26c, and any other proxy devices coupled to the local area network 22a. Each proxy device then performs its own diagnostic routine to identify the source of the failure. For example, if the master proxy device 26a determines that proxy device 26c has a failure while having been granted a request, the master proxy device 26a deletes the grant entry for the failed proxy device 26c from the master database 38a in step 76.

If in step 74 the proxy device 26c detects a failure in the master proxy device 26a, then any remaining proxy devices 26 on the LAN 22a renegotiate as in step 42 to identify a new master in response to the detected failure of the master proxy device 26a in step 80.

According to the disclosed embodiment, an arrangement using a master proxy device for mediation of establishment of circuit connections enables a transparently bridged network to use multiple proxy devices connected to the same transparently-bridged local area network. Hence, the disclosed arrangement eliminates the problems normally encountered with relying on a single proxy device as a gateway to cross a wide area network. Hence, the disclosed arrangement provides a more robust and reliable network that permits the use of redundant peers.

It will be readily apparent from the foregoing that different means for identifying requests, granted permissions and denial may be used, depending on the desired address schemes. For example, although the disclosed arrangement has been described with respect to identification of a specific source-destination address, the request/permission/denial scheme may encompass prescribed address ranges or address types, consistent with the methodology of using a master proxy device to respond to identified request while minimizing the number of necessary requests due to previously granted or denied requests.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of intercommunication between first and second local area networks via a wide area network, the method comprising:

identifying a master proxy device from among at least two proxy devices coupled to the first local area network;

receiving by the proxy devices a frame transmitted by a first end station onto the first local area network for transfer to the second local area network via the wide area network;

sending a request to the master proxy device, by at least one of the other proxy devices on the first local area network, to transfer the frame to the second local area network;

outputting a response by the master proxy device onto the first local area network to the at least one other proxy device indicating whether the corresponding request is granted; and determining whether a circuit connection may be initiated via the wide area network for transfer of the frame, by the at least one other proxy device, based on the corresponding response received from the master proxy device.

2. The method of claim 1, further comprising initiating the circuit connection by one of the proxy devices having received a grant response from the master proxy device.

3. The method of claim 2, wherein the receiving step includes receiving the frame from the first local area network according to an Ethernet IEEE 802.3 based protocol.

4. The method of claim 2, wherein the sending step includes sending a plurality of requests from the other proxy devices, respectively, the outputting step comprising:

starting a timer in the master proxy device in response to reception of a first of the requests;

in response to a prescribed time interval having elapsed in the timer, selecting from a group of the requests, received by the master proxy device within the prescribed time interval, one of the requests for granting initiation of the circuit connection; and generating the grant response for the one proxy device corresponding to the one request.

5. The method of claim 4, further comprising generating in-use responses to remaining ones of the proxy devices having not been sent the grant response, respectively.

6. The method of claim 5, further comprising storing, in each of the remaining ones of the proxy devices, the corresponding in-use response indicating denial of the corresponding request in a denial database, each proxy device selectively generating subsequent requests to the master proxy device based on the in-use response stored in the corresponding denial database.

7. The method of claim 2, further comprising storing a grant entry in a database in the master proxy device indicating generation of the grant response, the master proxy device selectively granting subsequent requests for respective initiation of subsequent circuit connections based on the grant stored in the database.

8. The method of claim 7, wherein the request includes a source address of the first end station and a destination address specifying a second end station on the second local area network, the step of storing the grant entry including storing an identity of the one proxy device having received the corresponding grant response, and the source and destination addresses of the frame corresponding to the request.

9. The method of claim 8, further comprising forwarding frames between the first and second end stations via the circuit connection on the wide area network by the one proxy device having received the corresponding grant response, without generating further requests to the master proxy device, based on the grant response.

10. The method of claim 9, further comprising:

detecting a disconnect condition in the circuit connection by the one proxy device having received the corresponding grant response;

sending a circuit release message by the one proxy device having received the corresponding grant response in response to the detected disconnect condition; and removing the grant entry by the master proxy device from the database in response to the circuit release message.

11. The method of claim 7, further comprising:

detecting by the master proxy device a failure in the one proxy device having received the grant response; and deleting the grant entry from the database in response to the detected failure.

12. The method of claim 1, further comprising selecting by the master proxy device to initiate the circuit connection, the outputting step including outputting an in-use message as the response to the at least one other proxy device.

13. The method of claim 1, wherein the outputting step includes outputting in-use messages for all the requests based on a prescribed condition detected by the master proxy device, to prevent transfer of the frame to the second local area network.

14. The method of claim 1, further comprising transmitting one of a SABME frame and an XID frame as said frame by the first end station.

15. The method of claim 1, further comprising:
   detecting a failure in the master proxy device; and
   identifying a new master proxy device between the other proxy devices in response to the detected failure.

16. A local area network configured for internetwork communications via a wide area network, the local area network comprising:
   a first end station configured for outputting a frame onto the local area network; and
   proxy devices configured for establishing a circuit connection on the wide area network for transfer of the frame to another network, including:
      (1) a master proxy device configured for receiving requests for establishment of said circuit connection, the master proxy device selectively outputting a response indicating whether one of the requests is granted, and
      (2) at least one other proxy device for sending a corresponding one of the requests in response to reception of the frame, the at least one other proxy device determining whether the circuit connection may be initiated based on the corresponding response received from the master proxy device.

17. The network of claim 16, wherein the master proxy device generates a grant response to a selected one of the proxy devices in response to the requests, the master proxy device including a database for storing a grant entry identifying the grant response and the corresponding selected one proxy device, the master proxy device selectively granting subsequent requests based on the stored grant entry.

18. The network of claim 17, wherein each one of the proxy devices includes a database for storing the corresponding response received from the master proxy device, each proxy device selectively generating a corresponding one of the subsequent requests based on the stored response.

19. The network of claim 17, wherein the master proxy device, in response to detecting a failure in the selected one proxy device having received the grant response, deletes the grant entry in the database for reassignment of the circuit connection to another one of the proxy devices.

20. The network of claim 16, wherein the at least one other proxy device, in response to detecting a failure in the master proxy device, designates itself as a new master proxy device.

21. A method in a proxy device coupled to a local area network and configured for establishing a circuit connection with another local area network via a wide area network, the method comprising:
   establishing a communication with at least a second proxy device coupled to the local area network;
   determining the proxy device to be a master proxy device for the local area network from among the proxy device and the at least second proxy device coupled to the local area network;
   receiving a request from the at least second proxy device for establishing the circuit connection to the another local area network;
   selecting whether one of the proxy device and the at least second proxy device should establish the circuit connection in response to the received request; and
   sending a response to the at least second proxy device, based on the selecting step, indicating whether the corresponding request has been granted.

22. The method of claim 21, further comprising adding an entry to a denial database based on the selecting step, the denial database storing entries for each of the proxy devices having been denied the corresponding request.

23. The method of claim 22, wherein the request includes source and destination addresses, the adding step including adding a plurality of entries for the respective proxy devices indicating no circuit connection is to be established for the source and destination addresses in response to the corresponding request.

24. The method of claim 21, further comprising adding an entry to a grant database based on the selecting step, the master database storing entries identifying the one proxy device selected to establish the circuit connection and the corresponding request.

25. The method of claim 24, further comprising deleting the entry from the grant database in response to a circuit release message from the one proxy device.

26. The method of claim 24, further comprising deleting the entry from the grant database in response to a detected failure in the communication between the master proxy device and the one proxy device.

27. A method in a proxy device coupled to a local area network and configured for establishing a circuit connection with another local area network via a wide area network, the method comprising:
   establishing a communication with at least a second proxy device coupled to the local area network;
   determining the second proxy device to be a master proxy device for the local area network;
   sending a request to the master proxy device, in response to reception of a frame transmitted by an end station on the local area network, for establishing the circuit connection to the another local area network for transfer of the frame; and
   selectively establishing the circuit connection based on a response, received from the master proxy device, indicating whether the corresponding request has been granted.

28. The method of claim 27, further comprising adding an entry to a denial database based on the response indicating the corresponding request has been denied, the proxy device selectively outputting another request to the master proxy device, in response to a corresponding subsequent frames from the end station, based on the added entry.

29. The method of claim 27, further comprising adding an entry to a grant database based on the response indicating the corresponding request has been granted, the proxy device forwarding subsequent frames between the circuit connection and the end station based on the added entry.

30. The method of claim 29, further comprising:
   detecting a circuit disconnect in the circuit connection;
   deleting the entry from the grant database; and
   outputting a circuit release message indicating the circuit connection has been disconnected to the master proxy device.

31. A proxy device configured for establishing a circuit connection between a local area network and another local area network via a wide area network, the proxy device including:
   a first network port for communication with a second proxy device via the local area network;
   a second network port for communication with the another local area network via the wide area network;

a database for identifying one of the proxy device and the second proxy device as a master proxy device; and a control unit configured for one of (1) sending a request for establishment of the circuit connection for a received frame to the second proxy device, and (2) selecting whether one of the proxy device and the second proxy device should establish the circuit connection, based on the database identifying the master proxy device.

32. The proxy device of claim 31, further comprising a grant database for storing a grant entry indicating whether the proxy device has been granted permission to establish the circuit connection.

33. The proxy device of claim 32, wherein the control unit deletes the grant entry in response to a detected circuit disconnect by the second network port.

34. The proxy device of claim 31, further comprising a denial database for storing an entry indicating whether the proxy device has been denied permission to establish the circuit connection.

35. A computer readable medium having stored thereon sequences of instructions for selectively establishing, by a proxy device coupled to a first local area network, a circuit connection with another local area network via a wide area network, the sequences of instructions including instructions for performing the steps of:

establishing a communication with at least a second proxy device coupled to the local area network;

determining the proxy device to be a master proxy device for the local area network from among the proxy device and the at least second proxy device coupled to the local area network;

receiving a request from the at least second proxy device for establishing the circuit connection to the another local area network;

selecting whether one of the proxy device and the at least second proxy device should establish the circuit connection in response to the received request; and sending a response to the at least second proxy device, based on the selecting step, indicating whether the corresponding request has been granted.

36. The computer readable medium of claim 35, further comprising instructions for performing the steps of adding an entry to a denial database based on the selecting step, the denial database storing entries for each of the proxy devices having been denied the corresponding request.

37. The computer readable medium of claim 36, wherein the request includes source and destination addresses, the adding step including adding a plurality of entries for the respective proxy devices indicating no circuit connection is to be established for the source and destination addresses in response to the corresponding request.

38. The computer readable medium of claim 35, further comprising instructions for performing the steps of adding an entry to a grant database based on the selecting step, the master database storing entries identifying the one proxy device selected to establish the circuit connection and the corresponding request.

39. The computer readable medium of claim 38, further comprising instructions for performing the steps of deleting the entry from the grant database in response to a circuit release message from the one proxy device.

40. The computer readable medium of claim 38, further comprising instructions for performing the steps of deleting the entry from the grant database in response to a detected failure in the communication between the master proxy device and the one proxy device.

41. A computer readable medium having stored thereon sequences of instructions for selectively establishing, by a proxy device coupled to a first local area network, a circuit connection with another local area network via a wide area network, the sequences of instructions including instructions for performing the steps of:

establishing a communication with at least a second proxy device coupled to the local area network;

determining the second proxy device to be a master proxy device for the local area network;

sending a request to the master proxy device, in response to reception of a frame transmitted by an end station on the local area network, for establishing the circuit connection to the another local area network for transfer of the frame; and selectively establishing the circuit connection based on a response, received from the master proxy device, indicating whether the corresponding request has been granted.

42. The computer readable medium of claim 41, further comprising instructions for performing the steps of adding an entry to a denial database based on the response indicating the corresponding request has been denied, the proxy device selectively outputting another request to the master proxy device, in response to a corresponding subsequent frames from the end station, based on the added entry.

43. The computer readable medium of claim 41, further comprising instructions for performing the steps of adding an entry to a grant database based on the response indicating the corresponding request has been granted, the proxy device forwarding subsequent frames between the circuit connection and the end station based on the added entry.

44. The computer readable medium of claim 43, further comprising instructions for performing the steps of:

detecting a circuit disconnect in the circuit connection;

deleting the entry from the grant database; and outputting a circuit release message indicating the circuit connection has been disconnected to the master proxy device.

* * * * *